June 23, 1936.  W. D. LA MONT  2,044,797
STEAM GENERATING PLANT
Filed Sept. 3, 1932  3 Sheets-Sheet 2

INVENTOR
WALTER DOUGLAS LAMONT
BY Newell & Spencer
ATTORNEYS

June 23, 1936.  W. D. LA MONT  2,044,797
STEAM GENERATING PLANT
Filed Sept. 3, 1932   3 Sheets-Sheet 3
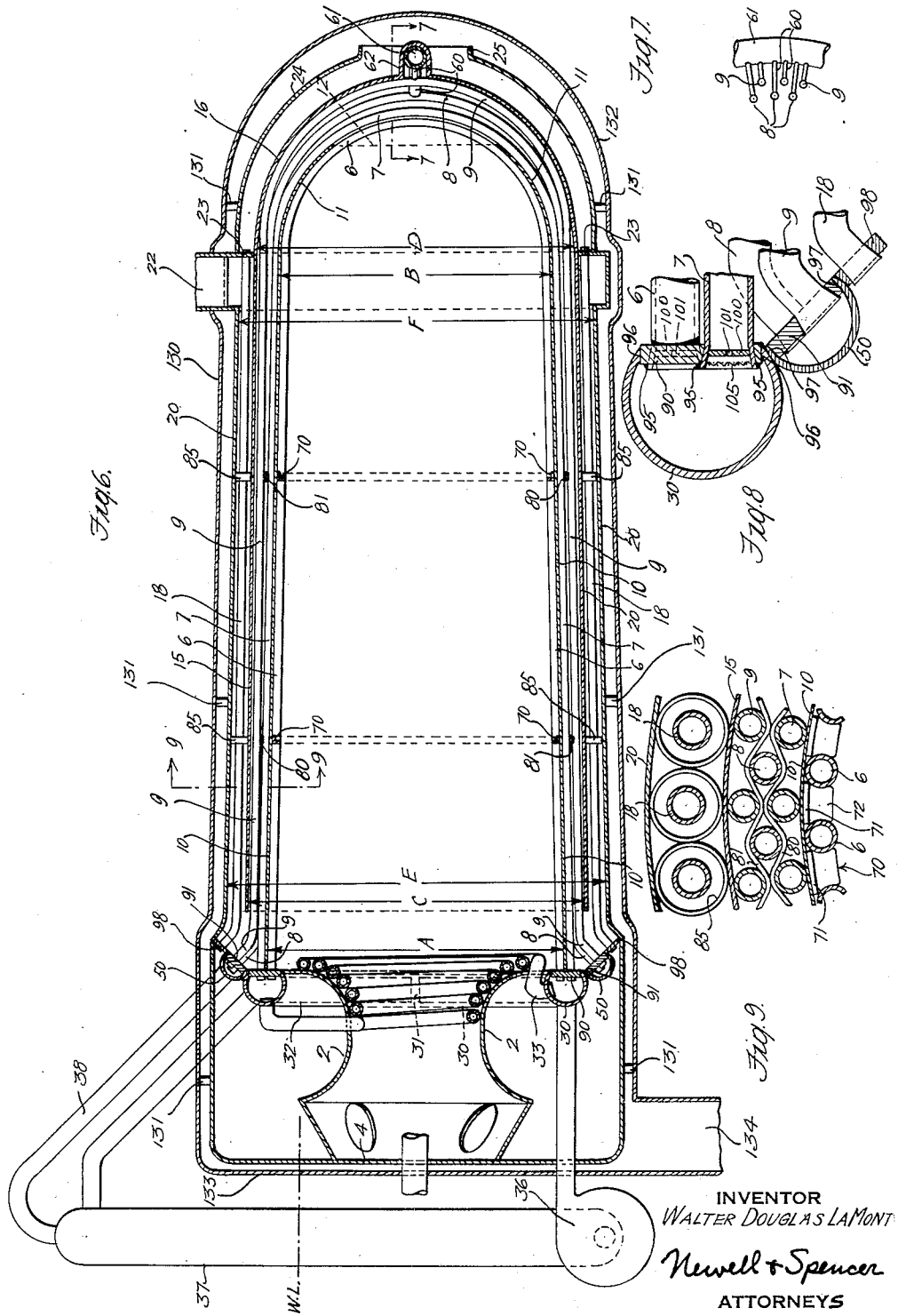
INVENTOR
WALTER DOUGLAS LAMONT
Newell & Spencer
ATTORNEYS Patented June 23, 1936

2,044,797

UNITED STATES PATENT OFFICE 2,044,797

STEAM GENERATING PLANT

Walter Douglas La Mont, North Colebrook, Conn., assignor to La Mont Corporation, New York, N. Y., a corporation of New York Application September 3, 1932, Serial No. 631,703

40 Claims. (Cl. 122—276)

This invention relates to steam generators and more especially to steam generators for automotive vehicles.

In the application of steam generating plants to automotive vehicles of different kinds, the problem of securing a high capacity of the plant and especially of the steam generating plant with a small weight for the apparatus and of so constructing the plant that it will occupy a small space has long been recognized. In such automotive vehicles, for example, as steamships and steam driven vessels, locomotives and automobiles, it has been necessary to crowd the apparatus into relatively small spaces and to sacrifice attainable efficiencies in order to provide apparatus having the necessary capacity in the available space.

As is well known, the requirement of low weight with high capacity, and particularly of high efficiency as affecting the amount of fuel to be carried, is a serious one in the design of aircraft. For this reason, among others, the use of steam driven apparatus for the operation of aircraft has heretofore been difficult or impossible. With the advent of high steam pressures and the development of high speed turbines and efficient and reliable reduction gears, the problem of using steam driven prime movers in aircraft, as well as in other automotive vehicles, has been simplified because such prime movers may be built with less weight for a given amount of power while operating at a high efficiency. Moreover, in the case of aircraft, the reduction gear makes possible the operation of the propeller at the most efficient speed, thus reducing the amount of capacity which it is necessary to provide in the prime mover.

The problem of obtaining a light weight steam generator of high capacity and high efficiency has heretofore not been satisfactorily solved. Especially insufficient consideration has been given to the problem of combustion of the fuel in order that this combustion may be most efficient, thus making it possible to burn less fuel for a given amount of travel or to make possible longer trips or, in the case of the airplane, longer flights between fueling stations.

Moreover, the problem of absorbing the heat from the gases by convection, whether in the generation of the steam or in the superheating thereof, has not been given sufficient attention. The tubes have not been arranged as efficiently as possible both as to the physical action of heat absorption and as to the best utilization of space. Except in rare cases, the absorption of heat from the gases for heating the combustion air has not been effected in order to increase the efficiency. Where such steps have been taken, the arrangement of the parts has required considerable space and added materially to the weight.

In my copending application Serial No. 209,024, filed July 28, 1927, I disclose a process of generating steam and apparatus for carrying out the process, which process and apparatus advantageously may be applied to automotive vehicles. According to the process of said application Serial No. 209,024, the steam is generated in a tube into one end of which water is delivered in quantity greater than the evaporation in the tube, but said quantity is so restricted, as by an orifice at the water inlet end of the tube, and the cross sectional area of the tube is so determined with respect to the amount of steam to be generated in the tube and with respect to said restricted amount of water that the flow of the steam through the tube and the sweeping action thereof spreads the water over the inner surfaces of the tube to maintain them wet and causes the water to travel through the tube and to be discharged from the outlet end of the tube together with the steam. When tubes are operated according to said process, it is possible to place the tubes so that the flow of water therethrough is maintained without or against the influence of gravity. Thus in an automotive vehicle with tubes so operated it is possible to place the tubes in horizontal positions or to bend the tubes to fit conditions of the furnace or other conditions in the vehicle. In the case of airplanes which many times travel in lines of motion at acute angles to the horizontal, the flow of water through the tubes, that is, the circulation of water necessary to maintain the steam generation, is maintained regardless of the position of the vehicle.

Moreover, tubes operated upon the principle described in said application Serial No. 209,024 may be of much less cross sectional area than tubes normally used for generation of steam. Thus it is possible not only to use a tube of smaller wall thickness for a given pressure, but it is also possible to place a larger number of tubes in closer spacing than with tubes of large cross section. Moreover, the weight of the tubes is thus reduced for a given capacity and this saving in the weight in addition to the saving of weight which is accomplished by only partially filling the tubes with water, as described in said application Serial No. 209,024, effects a great reduction in the total weight of the steam generator. Other savings in weight are possible in the use of the system described in said application Serial No. 209,024 and in my prior patent 1,545,668. Said application and said patent disclose constructions which provide for a complete circuit of the water and the separation of steam and water in a chamber exteriorly arranged with respect to the generating tubes, said chamber containing a relatively small amount of water and being of relatively small size.

It is an object, therefore, of the present invention to provide a steam generating plant having a high efficiency of combustion and heat absorption.

Another object of the invention is to provide such a plant in a form which is compact for use in an automotive vehicle.

Another object of the invention is to provide a furnace of ample combustion capacity in combination with heat transfer elements and to provide for efficient absorption in a small space of the heat from the products of combustion.

A further object of the invention is to provide a simple arrangement of steam generating tubes and headers in relation to a furnace for absorption of the heat of the furnace and hot gases delivered from the furnace.

A still further object of the invention is to provide for an arrangement of steam generating, superheating tubes and air preheater tubes within a plurality of casings to form a complete steam generating and superheating plant.

Other objects of the invention will appear from the following description taken in connection with the drawings, in which:

Figure 6 shows a longitudinal section of another form of the invention;

Figure 7 shows a horizontal section on line 7—7 of Figure 6;

Figure 8 shows an enlarged detail of the headers and tubes shown in Figure 6;

Figure 9 shows a section on lines 9—9 of Figure 6 showing the tube spacing devices;

Figure 10 shows a modified form and arrangement of the spacers;

Figure 11 shows a modified form of the U tube construction; and

Figure 12 shows another modification of the tube and header construction and arrangement.

Figure 1:
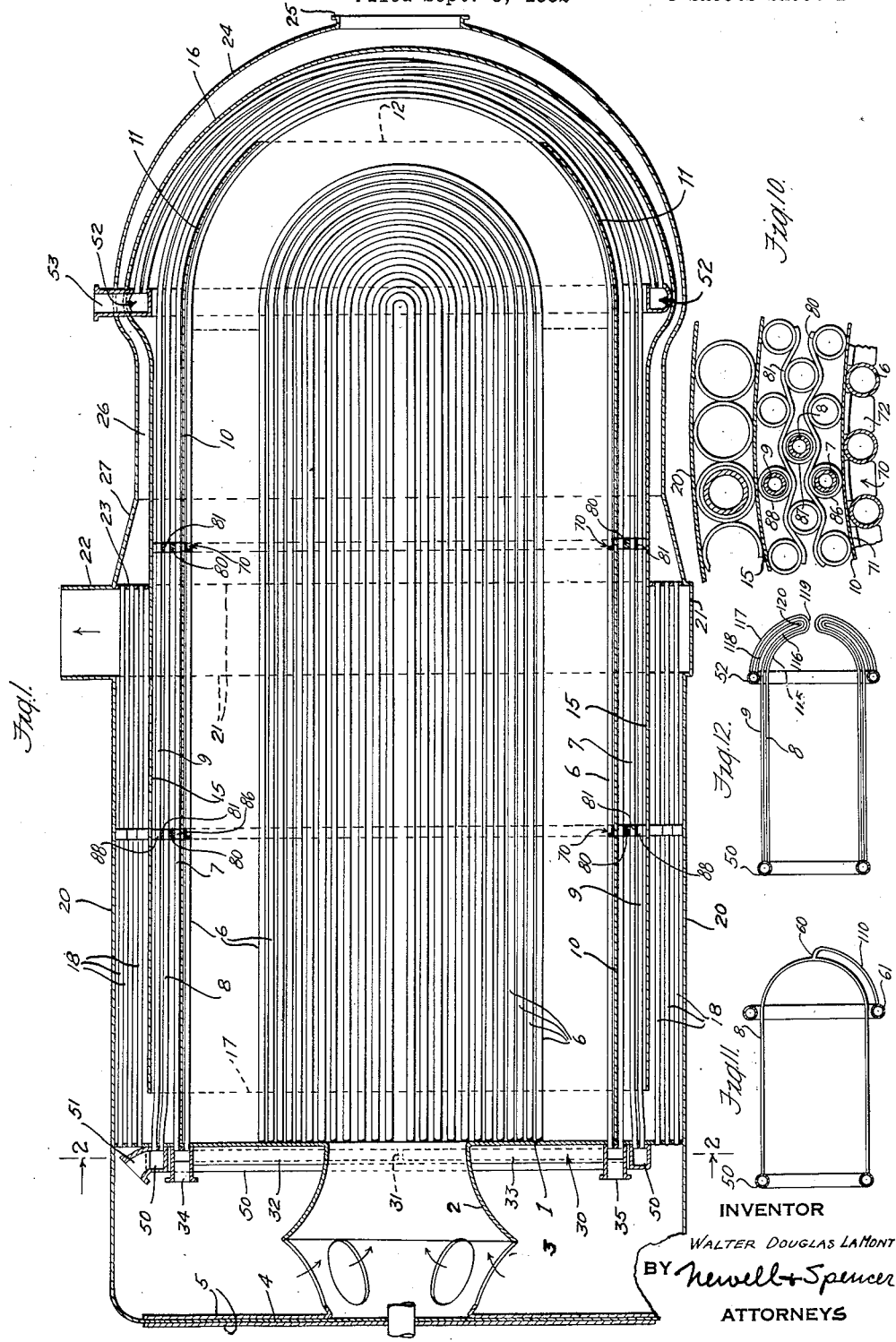
Figure 1 shows a longitudinal section of the steam generating plant according to the invention.

In Figure 1 is shown an end wall 1 of a furnace having a flared flange portion 2 connected to a cone shaped member 3 diagrammatically shown, which member 3 has openings therein through which the air for combustion may enter. Said portion 2 and said member 3 provide a structure within which may be mounted a burner, not shown, for the combustion of fuel. An end wall 4 reenforced by plates 5 on either side thereof forms a support for the member 3, through which wall the fuel may be introduced by a suitable connection not shown.

Surrounding the furnace space is a sheet metal wall 10. In the embodiment shown in Figure 1 this sheet metal is formed as a right cylinder and is connected to the wall 1 at the end of the furnace to form a substantially gas tight enclosure with said wall 1. At the end of the furnace remote from said wall 1 said sheet metal wall is modified from the cylindrical form to a spherical form as shown at 11.

The portion 11 is formed from a sphere having the same diameter as the diameter of the cylinder and is connected thereto. However, the portion 11 does not form a complete hemisphere but only a segment of a hemisphere. Thus there is provided an opening the edge of which is indicated at 12, through which opening may pass the combustion gases generated in the furnace by combustion of the fuel supplied by the burner at the opposite end of the furnace.

Surrounding said furnace and said cylindrical wall and spaced therefrom is a casing 15 which in the embodiment shown is also of cylindrical form and parallel to the wall 10. Said casing 15 forms with said wall 10 an annular space surrounding the furnace. The wall 15 also extends at the end of the furnace remote from the burner in a generally spherical form and in generally parallel relation to the spherical portion 11 of the furnace wall. The spherical portion 16 of the casing is without opening therethrough. Thus it will be clear that the combustion gases passing through the opening in the wall 11 must pass through the annular space, both through that portion of said space between the spherical portions of the wall and the casing and along the longitudinal extent of the annular space, in a direction toward the burner end of the furnace. As shown in Figure 1, the casing 15 does not extend to the wall 1 as does the wall 10, but the end 17 of said casing is at a distance from said wall 1. Thus a space is provided at the end of said casing through which the gases traveling along the annular space may pass outwardly or radially from said annular space.

Surrounding the casing and the wall in the particular embodiment shown in Figure 1 is a second casing 20 forming with the casing 15 a second annular space, said casing 20 being also of cylindrical form in the embodiment shown in the figure. As mentioned above, the gases from the annular space between the wall 10 and the casing 15 pass out radially, but the casing 20 confines said gases to flow along the annular space between the casing 15 and the second casing 20 in a direction toward the spherical end of the structure.

Figure 2:
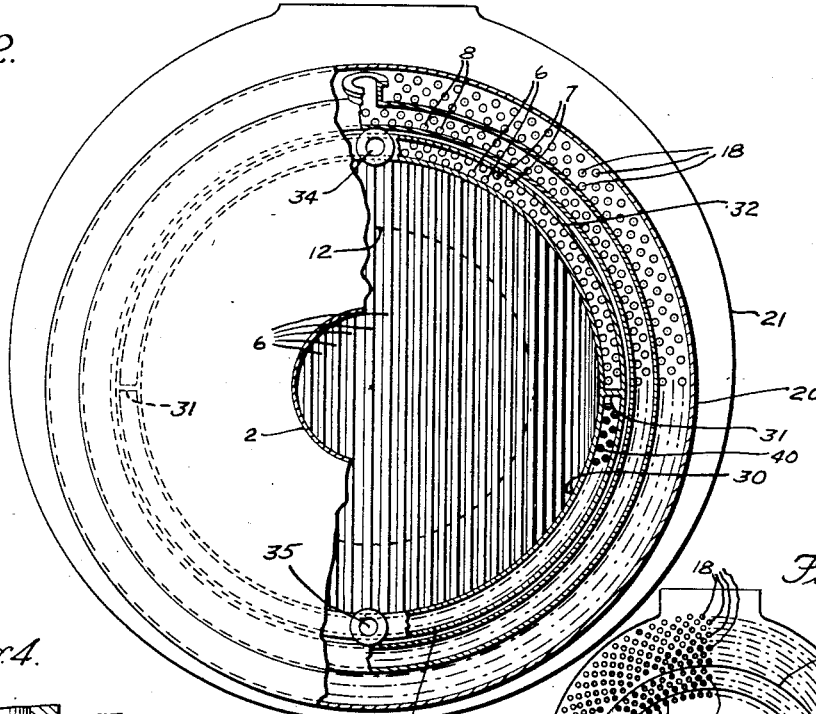
Figure 2 shows a transverse section on line 2—2 of Figure 1.

At 21 is provided a chamber or passage arranged eccentrically with respect to the casings 15 and 20 so that the cross section of said chamber measured by dimensions radially and longitudinally is less at one side of the casing 20 than at the opposite side, as shown in Figure 2. The outlet of said chamber or passage is shown at 22 on the side of the eccentric chamber having the largest cross section. It will be clear from a study of Figures 1 and 2 that the gases flowing in said passage or chamber are of increasing volume because of the addition of the volumes of the gases radially delivered from the annular space between the casing 15 and the enclosing casing 20 at various and successive points circumferentially around said annular space. The eccentric form thus provides for the increase in volume and for discharge of the gases at one side of the structure.

In the annular space between the casings 15 and 20 as shown in Figure 1 are mounted tubes 18 extending from, and connected in, the wall 1 and extending from said wall lengthwise of said annular space to an annular plate 23 at the remote end of said space. Thus these tubes are contacted by the heating gases delivered to said annular space from the annular space between the sheet metal wall 10 and the casing 15. Beyond said tubes said casing 15 and the curved portion 16 thereof and the enclosing casing 20 are modified to provide an annular space between the casing 15 and said casing 20 and between the curved casing 16 and a curved portion 24 of said enclosing casing. In the curved or spherical portion of the casing 24 is an opening provided with a flange 25 through which the air for combustion may enter. The casings 24 and 16 are so formed as to reduce the width of the annular space between said casings in a direction toward the portions thereof of larger diameter of the annulus, thus obtaining a compensation for the increase of cross sectional area of the flow of the air due to the larger diameter. The cross section of that portion of the annular space 26 lying between the spherical portions of casings 16 and 24 and the cylindrical portions of casings 15 and 20 is of corresponding annular width. In order to direct the air for combustion so as to enter the tubes 18, the conical casing 27 is provided. The air thus flows through the tubes toward the burner end of the structure and into the space formed between the plate 1 and the portion 2 thereof on one side and the end wall 4 on the other side, the casing 20 in the embodiment shown extending longitudinally beyond the plate 1 to meet the end wall 4. Thus the combustion air which has entered through the opening at flange 25 is delivered through the annular space and flows through the tubes 18 in a direction counter to the flow of the gases which contact said tubes as they flow through the space between the casings 15 and 20. The flowing air completely surrounds the structure and prevents the loss of heat therefrom.

In Figures 1 and 2 is shown a header 30 in the form of an annulus arranged in a plane at right angles to the axis of the furnace. In this embodiment, this header is adjacent the wall 1 and is concentric with the axis of the furnace. Said header as shown is divided by a wall 31 into two chambers, 32 and 33, as shown in Figures 1 and 2. Each chamber is provided with an opening shown respectively at 34 and 35. As illustrated in Figure 2, the wall of said header lying in a plane at right angles to the axis of the furnace is provided with holes into which may be fastened the ends of tubes. As shown, these holes are in staggered arrangement around the circumference of the header. As may be clearly seen from Figure 1, U tubes are connected to said header with the ends thereof positioned in said holes, each tube having one end positioned in a hole in one chamber and the other end positioned in a hole in the other chamber. The U tubes 6 which are connected to the inner ring of holes lie within the furnace with respect to the sheet metal wall 10. The tubes being of U form are bent with such radii that they conform and fit to the curvature of the curved portion 11 of said wall. It will be clear from a study of Figures 1 and 2 that the U tubes within the furnace are provided with bends of different radii and that the straight portions of the tubes extend along the wall longitudinally of the furnace in substantially parallel arrangement and that the ends of the U's are also in substantially parallel arrangement, the bends of smaller radius being at the far side and near side of the structure as shown in Figure 1 and the bends of largest radius being substantially in a vertical plane through the axis of the furnace chamber. Thus it will be clear that the end formation of the assembly of the U tubes is substantially that of a sphere and conforms to the spherical portion 11 of the wall 10.

On the opposite side of the wall and lying in the annular space between the sheet metal wall 10 and the casing 15 are positioned the U tubes 7 which are of similar form and arrangement and are connected to the outer ring of holes in the header 30, one end of each tube being connected to the chamber 32 and the other being connected to the chamber 33 of said header. These tubes also are provided with bends of different radii in order to conform to and fit to the form of the curved or spherical portion 11 of the wall 10. It will now be clear from Figures 1 and 2, and also may be seen from Figure 5, that the sheet metal wall 10 passes between the inner and outer rings or rows of tubes 6 and 7. Thus the tubes 6 are subjected to the radiant heat and the tubes 7 are subjected to the heat of the gases flowing along the annular space between the wall 10 and the casing 15.

The tubes 6, by intercepting the radiant heat of the furnace, thus protect the wall 10. In many cases this protection will be sufficient to prevent the overheating of the metal of the wall 10 and its curved portion 11, but in the preferred embodiment, especially with high rates of combustion, and high temperatures in the furnace, the wall 10 and the portion 11 thereof are made of alloy steel, such as chrome nickel steel, which may be subjected to extremely high temperatures without deterioration. Moreover, when sheet metal is used for the wall 10 any heat passing therethrough by conduction may pass into the tubes 7 if said tubes are in contact therewith or the wall may radiate heat to said tubes. Thus a full absorption of the heat of the furnace, whether by radiation or conduction and convection action, is provided for.

Figure 4:
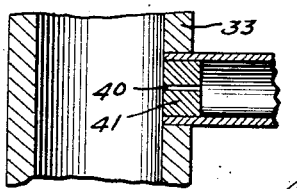
Figure 4 shows a diagrammatic cross section of the water inlet portion of the header to which the tubes are connected.

In the preferred embodiment of my invention, I provide at the ends of the tubes connected to one header a restriction, such as an orifice 40 in the orifice plug 41, as shown in Figure 4. Various arrangements may be utilized, but in the embodiment shown in Fig. 4, which is merely illustrative, the plug 41 is inserted in the tube and made tight to said tube at the circumference of the plug. If, for example, the ends of the tubes connected to the chamber 33 of the header 30 are all provided with orifice plugs 41, water entering through the opening 35 must pass through the orifices 40 in order to enter the tubes 6 and 7. The size of these orifices may be varied to suit the conditions of steam generation to which the tubes are subjected, those tubes subjected to the radiant heat usually being provided with a larger orifice than those subjected merely to convection heat. The size of the orifice also may be varied in accordance with the pressure of the water within the header chamber 33. When the orifice is of suitable size in consideration of the water pressure and the steam generating conditions to which the tube is subjected, water in quantity in excess of the amount of steam generated in each tube will enter the tube through the orifice, but the quantity will be restricted so that the water entering the tube does not completely fill the cross section of the tube throughout its length. As explained in my copending application Serial No. 209,024, in a tube of proper size the water will be carried through the tube in a continuous flow and will wet the inner surfaces of the tube and will be discharged from the tubes 6 and 7 to the chamber 32 of the header 30. The steam and water may be conducted from the opening 34 to a steam and water separator such as described in my copending application Serial No. 209,024 and in my prior Patent 1,545,668, the separated water being returned by means of the pump through the opening 35 to the chamber 33.

The size of tubes which are effective for this purpose and which are applicable for the present invention are about ½ inch to ¾ inch diameter and $\frac{1}{32}$ inch to $\frac{1}{16}$ inch thickness, but tubes of larger or smaller size and greater or less thickness may be used in some constructions. Tubes of such size may be arranged closely spaced, that is, on about 1 inch to 1½ inch centers, so as to absorb the desired amount of radiant heat and fully to protect the sheet metal wall 10 surrounding the furnace. Tubes so spaced in the annular gas passages provide for efficient transfer of heat from the gases passing through said annular spaces, it being well known that small tubes closely spaced will absorb a greater amount of heat than larger tubes with a larger spacing.

While only two rows of tubes, one on the furnace side of the wall 10 and the other in the annular space, have been shown in the present embodiment connected to the annular header 30, if desired, more than one row may be connected to the header on either side of the wall. For example, for certain uses the steam generator may be designed with two or three rows of U tubes in the annular space. These additional tubes may be connected similarly to tubes 6 and 7 so that the water is delivered thereinto through the orifices and the steam and water are discharged from the chamber 32 through the opening 34. Such modifications are within the scope of the invention.

In the embodiment shown a superheater is provided having an analogous arrangement to that of the steam generating section of the steam generating plant. In the particular arrangement shown in the figure an annular header 50 is placed concentric with the annular header 30 and exteriorly of the furnace adjacent the end wall 1 thereof. Said header has a flanged opening 51. Adjacent the opposite end of the cylindrical portion of the annular space between the wall 10 and the casing 15 is placed a second header 52, also annular and of somewhat larger annular diameter than the header 50. The header 52 has a flanged opening 53.

In the particular embodiment shown in Figure 1 the tubes 8 and 9 are connected between the header 50 and the header 52 and have the straight portions of the tubes extending through the annular space between the wall 10 and the casing 15 in parallel arrangement, said tubes being continued through the curved annular space between the curved surface portion 11 of the wall 10 and the curved casing 15. Thus the tubes 8 and 9 are in the form of J's having the long leg of the J connected to the header 50 and the end of the bend or bow of the J connected to the header 52. It will be noted that a tube such as the tube 8 connected to the header 50 on the upper side of the annulus of said header passes around the curved annular space in generally parallel arrangement to the annular passage or to the U bends of the tubes 6 and 7 and is connected to the header 52 at the lower side of the annulus of said header. Similarly, a tube 9 extending from the lower portion of the annular header 50 longitudinally through the annular space between the wall 10 and the casing 15 continues around the curved annular space to the header 52 at the upper side thereof. It will be clear from a study of Figures 1 and 2 that a plurality of tubes connected between headers 50 and 52 in parallel arrangement in the annular space and having different radii of the bow or bent portion of the J's may be arranged in substantially parallel arrangement in the curved portion of the annular space. However, it will be noted that for each tube connected at one side of the annular headers a corresponding tube has its bent or bow portion adjacent and substantially parallel to the bent or bow portion of a corresponding tube connected to the headers at the opposite sides of said headers. Thus there is provided a concentration or doubling-up of the heating surface in the curved annular space, the object of which will be more fully discussed hereafter.

Figure 3:
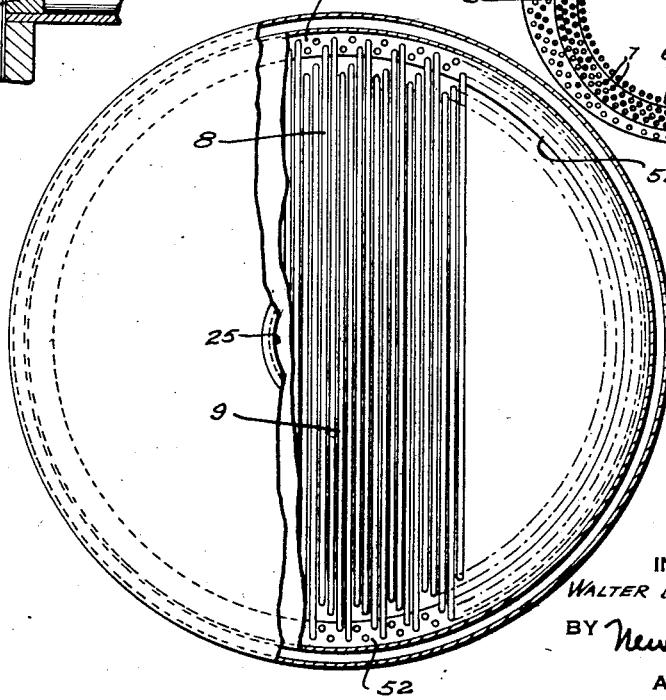
Figure 3 shows a view of the structure from the right hand end of Figure 1, the casings at said end being partially removed.

Similarly to the arrangement of the steam generating tubes 6 and 7, a plurality of rows of tubes 8 and 9 may be connected between the headers 50 and 52 as shown in the figures. These tubes 8 and 9, together with the tubes 7, are thus substantially uniformly arranged in staggered parallel arrangement within the annular space and, as has been stated above, the gases passing from the furnace may pass along the annular space and in contact with the exterior surface of the group of steam generating tubes 7 and the superheater tubes 8 and 9. It will be noted that the header 52 is of larger annular diameter than the header 50 and lies outside of both of the rows of superheater tubes 8 and 9. Thus the bends or bows of the J's of the superheater tubes may pass within the annulus of the header 52 without interference. Figure 3 shows an end view of the right hand end of Figure 1 with the casings 16 and 24 partially removed. Moreover, for simplicity, in order to show the parallel arrangement of the bows of the superheater tubes, only one row or layer of superheater tubes is shown in Figure 3. It will be noted, however, that a tube 8 connected to the header 52 at the upper side thereof in Figure 3 passes within the annular header at the lower side thereof and correspondingly a tube 9 connected to the header 52 at the lower side thereof passes within the annulus at the upper side thereof. It will also be apparent that the tube 8 and the tube 9 have their bent or bow portions of the J in parallel arrangement at the curved end of the furnace. It is possible, therefore, for one tube to be removed from the group of tubes by passing said tube out between the adjacent parallel tubes of the group. When a double row of superheater tubes is used, the arrangement of the tubes with respect to their size and spacing may be such that each tube will pass between not only the tubes adjacent thereto in its own row, but between the tubes of the second row. This is especially true in view of the flexibility of the tubes provided by the small diameter and thin wall. Similarly, it is possible to remove a generating tube 6 or 7 between the parallel tubes of the assembly.

For the purpose of such removal, the casings 16 and 24 and also, if desired, the portion 11 of the wall 10 may be removably joined to the cylindrical portions respectively of said casings and said wall. These casings may then be removed so as not to interfere with the removal of the tubes as has been just described. It will be noted, however, that the casings 16 and 24 lie outside of the annular header 52 in the embodiment shown in Figure 1 but are formed to fit to the cylindrical and spherical portions of said casings. While other arrangements of the header 52 with respect to said casings are possible, the arrangement shown affords a simple construction and retains the superheater tubes within the annular gas passage. Moreover, the air in passing through the annular space between the casings 16 and 24 will absorb any heat conducted or radiated through the casing 16, which heat will be returned to the furnace in the combustion air. Thus the annular passage between the casings 16 and 24, and also that portion of the annular space between the casings 15 and 20, provides an insulating enclosure to retain the heat generated in the furnace for absorption by the water and the steam for generation respectively of the steam and the superheating thereof.

From the above description it will be clear that the fuel introduced through the burner placed in the opening in the wall 1 at the end of the furnace is burned in the furnace space. As will be noted, in the embodiment illustrated the furnace is relatively long in the direction of its axis as compared with the diameter thereof. In a construction such as shown designed for aircraft to supply the steam for developing 2300 H. P. in the prime mover, the length of the cylindrical portion of the furnace would be approximately 8 feet and the diameter of the furnace about 4 feet. The radius of the spherical end of the furnace, therefore, would be about 2 feet. Thus is provided a relatively large combustion space for the efficient combustion of the fuel at relatively high temperatures. This makes possible the absorption of a large amount of heat by the radiant heat tubes 6.

The gases in passing through the opening 12 in the curved portion 11 of the casing 10 are turned in all directions into the annular space as has been described. Through the opening 12 may be exposed, in addition to the radiant heat tubes 6, portions of the tubes 7 passing across said opening. The tubes 6 and 7 thus may form a substantial or complete shield for the superheater tubes 8 and 9. However, all these tubes are subjected at the bent or bow portions thereof to the hottest gases as they leave the furnace, the temperature of the gases being reduced as they pass longitudinally along the annular space completely surrounding the furnace toward the burner end of the unit. This temperature reduction is effected by the absorption of heat by the steam generating tubes 7 as well as by the superheater tubes 8 and 9. A very large part of the steam is generated in the tubes 6 and the remaining portion of the required steam is generated in the tubes 7. By providing a greater or less number of tubes 6 exposed to radiant heat and a greater or less number of tubes 7 for absorption of the heat of the gases, various requirements of the steam generation may be met.

The steam separated in the separator mentioned above and shown in my copending application Serial No. 209,024 and my prior Patent 1,545,668 may be delivered through suitable piping to the opening 51 of the header 50. The steam then will flow through the superheater tubes 8 and 9 and be discharged therefrom into the header 52 from which it may be withdrawn through the flanged opening 53. Thus it will be noted that the flow of the steam as it is being superheated is counter to the flow of the gases through the annular space, the steam at lower temperature before superheating being delivered to the end of said annular space at which the gases are at the lower temperature and steam being discharged from the superheater tubes at the end of the passage which is at a higher temperature. Thus an efficient arrangement of the superheater is obtained with a corresponding reduction of the amount of heating surface required by the superheating in accordance with the well known advantage of counter flow.

In the construction of the superheater of the present invention, as shown in the embodiment illustrated in Figure 1, the concentration or doubling-up of the superheating surface at the curved end of the structure subjects a relatively large amount of superheating surface to the hottest gases. Thus, superheating of the steam is accomplished with a much reduced amount of heating surface. The straight portions of the J tubes, however, acting with the stem generating tubes 7, effectively cool the gases to such a degree that they may be discharged into contact with the air preheater tubes 18.

The air flowing through the tubes 18 from the end thereof inserted in the plate 23 toward the end thereof inserted in the wall 1 effects a further absorption of the heat from the gases and reduces the temperature of the gases to a point at which they may be discharged from the steam generating plant through the outlet 22 without great waste of heat. It will be noted that the air entering the structure through the opening 25 and passing through the annular space between the casings 16 and 24, thus insulating the structure against the loss of heat as described above, passes through the air preheater tubes 18 in a direction counter to the flow of the gases through the annular space between the casings 15 and 20 in contact with the outside of said tubes. This construction of the air preheater tubes, as well as of the superheater tubes, in relation to the furnace and the steam generating tubes constitutes a very efficient and compact arrangement of a steam generating plant of relatively large power which is especially advantageous for automotive vehicles.

Figure 5:
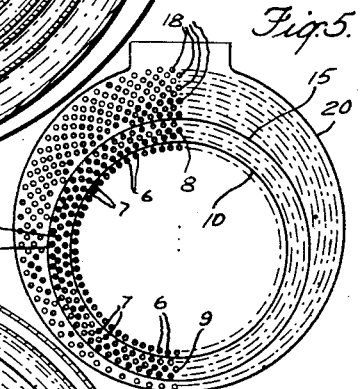
Figure 5 shows a diagrammatic cross section of the assembly of tubes and casings of modified form.

In the diagrammatic Figure 5 the wall 10 of the furnace and the casing 15 are shown forming the annular space for flow of the gases along said space. The eccentrically arranged casing 20 forms a chamber or channel of increasing cross section outwardly from said casing 15. In this modified embodiment air preheater tubes 18 are arranged in said chamber of passage and a larger number of tubes are arranged in the enlargement of the passage than in its more restricted portions, thus maintaining a close and preferably uniform spacing. The flow of the gases will be largely radially or outwardly transversely across said air preheater tubes. As a large amount of the heating surface will be provided by the successive rows of tubes outwardly from the casing 15, the length of said tubes will be shorter than that provided in the arrangement shown in Figure 1 for the same amount of heat transferring surface. In some cases such an arrangement may be more advantageous as to the amount of space required or other considerations than that shown in Figure 1, although the advantage of counter flow of the air with respect to the gas flow is not obtained to such an extent as is possible in Figure 1. In the extreme case the arrangement of Figure 5 provides for no flow of the gases lengthwise of the tubes. The gases which are delivered from the annular space adjacent the inner row or rows of air preheater tubes pass outwardly into contact with the outer rows of tubes while traveling spirally along the chamber or passage between the casing 15 and the eccentric form of the casing 20.

It will be apparent that for a given size of combustion chamber the annular spaces surrounding said chamber provide for a relatively large cross section of flow for the gases although the width of space between the casings enclosing the annular spaces is relatively small. Thus a large amount of heating surface may be placed in such an annular space without materially increasing the diameter of the structure. This construction makes possible the provision of a relatively large furnace space for efficient combustion of the fuel and a relatively contracted, though ample, gas passage in which may be placed a large amount of heating surface and through which the gases may flow at high velocity for efficient heat transfer both to the steam generating and superheating tubes and, as well, to the air preheater tubes. The hottest portions of the structure and of the gaseous products are entirely within the structure and are shielded on all sides by the surrounding casings and the heat absorbing surfaces as well as by the insulating air spaces.

Another form of the invention which embodies many of the features which have been described above in connection with Figure 1 is shown in Figure 6. In this figure the corresponding parts bear like reference numerals to those in Figure 1. The sheet metal wall 10 in the embodiment shown in Figure 6 is in the form of a frustrum of a cone of revolution having the elements of the cone converging toward the end of the furnace chamber remote from the burner. The burner, not shown, is fed through a pipe passing through the wall 4 and is inserted in a modified form of the flared flange portion 2 of the end wall 1 of the furnace. At the smaller end of said frustrum of the cone the sheet metal wall 10 is connected to a curved portion 11 which in the embodiment of Figure 6 is a portion of a sphere as in the embodiment of Figure 1. An opening 12 is provided in the spherical portion as in Figure 1 through which the gases from the furnace pass to an annular space between the sheet metal wall 10 and a casing 15 forming, as in the structure of Figure 1, an annular space surrounding the furnace chamber.

In the embodiment shown in Figure 6, however, the width of the annular space adjacent the hemispherical portion 11 of the wall 10 is greater than the width of the annular space between the wall 10 and the casing 15 at the end of the structure adjacent the burner. Moreover, the hemispherical portion 16 which is connected to the casing 15 is formed in relation to the hemispherical portion of the wall 11 so as to provide a continuation of the annular space with the portion adjacent the opening 12 larger than that portion where the hemispheres are connected respectively to the wall and the casing. The modification of the width of this annular space provides a reduction of the cross sectional area through which the gases from the furnace must flow in contact with the heat transfer elements, such as the steam generating tubes or the superheater tubes, so as to maintain adequate velocity of the gases as they become cooled by contacting said tubes.

The casing 15, however, is also made in the form of a frustrum of a cone of revolution and thus the diametral dimension of the casing adjacent the hemispherical portion 16 thereof is less than the diametral dimension of the end of the casing adjacent the burner. For example, the small diameter D of the frustrum of the cone of the casing, which in the embodiment shown in Figure 6 is substantially the diameter of the hemispherical portion 16 of said casing, may be 37¼ inches. The diameter C at the burner end of the casing then may be 37⅞ inches. The small diameter B of the furnace chamber may be 33¼ inches and the large diameter A of said furnace chamber at the burner end thereof may be 34½ inches. From these dimensions it will be evident that the width of the annular space between the wall 10 and the casing 15 at the burner end of the furnace is 1 11/16 inches whereas the width of the annular space at the end thereof remote from the burner is 2 inches. By suitably selecting the centers of curvature of the wall 11 and the casing 16 the variation of the width of the annular space between the curved portion of the wall and of the casing may be made so as to continue the contraction in the annular area provided by the concentric conical portions respectively of the wall 10 and the casing 15.

As will be seen from Figure 6, U tubes 6 are mounted on the furnace side of the wall 10 and adjacent thereto so as to conform to the tapered form of the furnace and to continue around the curved portion 11 of the wall. Within the annular passage between the wall 10 and the casing 15 are mounted steam generating tubes 7. The form and arrangement of these tubes may be similar to that shown in Figure 1 and they may be provided with bends of different radii to conform to the hemispherical portion 11 of the wall and may have their legs extending in generally parallel arrangement so that the ends of the tubes may be connected to an annular header 30 divided into two chambers, 32 and 33, by a partition or wall 31. As is described in connection with Figure 1, water may be delivered by a pump 36 to the chamber 33 of the header 30 and the generated steam and the excess water discharged therewith from the tubes 6 and 7 to the chamber 32 may be delivered through the connections shown to the steam and water separator 37 in which the water is separated from the steam and may then be returned by the pump to the chamber 33. The separated steam may be delivered through the pipe 38 to the superheater header 50.

U tubes 8 and 9 are arranged in the annular space between the wall 10 and the casing 15 and have both their ends connected to the header 50. Instead of the annular header 52 to which, as in Figure 1, superheater tubes in the form of J's are connected at the ends thereof remote from the header 50, in the embodiment in Figure 6 connections 60 are made upon the bows or bends of the U's to a header 61 mounted within the bulged portion 62 of the casing 16, which header 61 may extend in semicircular form around the assembly of the tubes. Thus individual connections are made from each of the superheater tubes of U shape to the header 61 for delivery thereto of the steam superheated in the tubes 8 and 9.

The bulged portion 62 of the casing 16 is suitably joined to said casing 16 to form a gas tight enclosure and to separate the steam generating and superheating tubes from the annular space surrounding the casing 16 and formed between said casing 16 and the casing 24 in a manner similar to that described in connection with Figure 1. The entrance of the air to be used for combustion is provided through the opening 25 corresponding to that shown in Figure 1.

Surrounding the structure above described is an enclosing casing 20 similar to that of Figure 1 and forming with the casing 15 an annular space for passage therethrough of the gases discharged from the annular space between the wall 10 and the casing 15. The diametral dimension of the enclosing casing 20 at the end thereof remote from the burner is less than that of the casing 20 adjacent the burner. In a structure having the proportions set forth above the enclosing casing 20 may have a diameter at the end thereof remote from the burner of 39 inches and at the end thereof adjacent the burner 40 inches. In such a structure, then, the width of the annular space between the casing 20 and the casing 15 at the end thereof remote from the burner will be ⅞ inch and at the end thereof adjacent the burner will be 1 1/16 inches. Thus it will be clear that the gas passage formed between the casing 20 and the casing 15 decreases in a direction remote from the burner to correspond with the reduction of the temperature of the gases received by said annular space from the annular space between the casing 15 and the wall 10. In this manner the desired velocity of the gases throughout their flow through the annular space is maintained.

At the end of said annular space between the casings 20 and 15 is an outlet 22 for the gases. Fastened in the wall 23 thereof and extending longitudinally through the annular space are air preheater tubes 18 through which the air received through the opening 25 may pass toward the space between the end wall 1 of the furnace and the end wall 4 of the structure in the manner described in connection with Figure 1. It will be noted that in the embodiment shown in Figure 6 only one row of air preheater tubes is provided in the annular space. These tubes at the end thereof adjacent the burner are connected to a plate 98 (Figure 8) which is suitably fastened with a gas tight connection to the enclosing casing 20 and to the header 50, the header 50 being also suitably sealed with respect to the header 30 so that leakage of the gas from the annular spaces into the air chamber between the end wall 1 of the furnace and the end wall 4 of the structure may be prevented.

While in the drawings tubes of uniform diameter throughout their length are shown which are the type of tubes customarily used in air preheaters, in view of the high velocities which I utilize for the gas and air flow in the steam generating plant of my invention in some cases I propose to use tapered tubes for the air preheater tubes. For such a purpose, in the construction illustrated in the figures the air preheater tubes 18 would be placed with the end having the small diameter fastened in the plate 23 and the end of large diameter fastened in the plate 98, Figure 8. With this arrangement the air entering through the opening 25 will pass through the tubes, expanding as it is heated, and will be discharged from the tubes at the large end thereof for delivery to the burner. Thus the velocity of the air within the tube will be maintained at uniform or desired rates in the various portions of the length of the tube so as to secure an efficient transfer of heat.

In Figure 9 is shown a cross section on line 9—9 of the annular spaces between the casings and the wall. In this figure the tubes 6, 7, 8 and 9 are marked in the same manner as shown in Figures 1 and 6. Between the tubes 6 and suitably fastened to the wall 10 are spacers 70 which, like the wall 10, may be formed of sheet metal, having a flanged portion 71 for attachment, as by welding, to the wall 10 and having a flanged portion 72 at right angles to the flange 71 and transversely to the end of the tubes. The flanged portion 72 is provided with notches or otherwise formed to fit the tubes 6, thus locking the tubes 6 in position and causing said tubes to act with the wall 10 to form a rigid structure. The spacers may be located in sets placed at different points along the tubes suitably to space the tubes at intervals along the length thereof to maintain them in a uniform or the desired relation for proper absorption of the heat of the furnace.

Between the tubes 7 and 8, as shown in Figure 9, is the band 80 which passes between the respective rows of tubes and at a suitable point upon the circumference of the structure may be drawn during manufacture so as to be left under tension to press the tubes 7 against the wall 10. Likewise, between the tubes 8 and 9 may pass the band 81 in such relation to the band 80 that it will press the tubes 8 against said band 80, thus adding to the rigidity of the structure as a whole. Moreover, tension upon the band 81 may press the tubes 9 against the casing 15 and cause said tubes 9 to act with said casing 15 to form a rigid structure. It will be clear from this description that between the tubes 6 and the casing 15 there is thus provided not only means of positioning the tubes properly with respect to each other for passage of the gas over the tubes lengthwise thereof or to absorb the radiant heat from the furnace, but a complete mechanical interaction of the parts is secured so that the thin metal wall or casing which is utilized to obtain a light structure is reenforced and the tubes act with said wall and casing and with said bands without need of other support to provide rigidity and strength. In Figures 1 and 6 the corresponding positions of the bands are diagrammatically shown and marked with their respective numerals.

In order to position the air preheater tubes between the enclosing casing 20 and the casing 15 and to provide mechanical strength and support for the casing 20, the spacers 85 consisting of short pieces of tube of a suitable diameter to fit between the casing 20 and the casing 15 are placed in contact with each other. The size of these spacers will be determined by the desired spacing of the tubes with respect to each other and the form of the spacers may be modified suitably to modify said spacing of the tubes and to fit to both the casings 15 and 20. While in the embodiment shown the tubes 18 are not in close contact with the spacers 85, nevertheless they substantially maintain a spacing between said tubes which will secure a substantially uniform distribution of the gases into exterior surface contact with said tubes, it being impossible with the construction shown that the distortion of the spacing may be accumulated circumferentially of the structure and thus cause the gases to by-pass some of the heating surface.

A modification of the construction shown in Figure 9 is shown in Figure 10 in which, similarly to the arrangement shown for the air preheater tubes 18 in Figure 9, the tubes 7, 8 and 9 are surrounded by rings 86, 87 and 88 upon which the bands 80 and 81 may bear and with which they may act in the same manner as described in connection with Figure 9. In addition to the advantage of securing the desired spacing by proper choice of the diameter of the rings 86, 87 and 88, this construction makes possible the easy withdrawal of individual tubes, the legs of the U's slipping readily through the rings.

It will be clear from a comparison of Figures 9 and 10 that the spacing of the tubes 78 and 79 in Figure 9 is somewhat closer than that of Figure 10. With tubes of the same diameter throughout their length by using the modification shown in Figure 10 it is thus possible to modify the spacing of the tubes in conformance with the variations in the cross sectional area of the gas passages as provided by the tapering casings described above in connection with Figure 6 while retaining the advantages of the rigid structure and interaction of all the parts thereof. The rings in such case act in the manner in which the tubes act in the construction of Figure 9. In Figures 1 and 6 two lines or positions of spacers and reenforcement are shown in the length of the furnace except that in Figure 1 only one set of spacers is shown for the set of air preheater tubes 18.

In Figure 8 in enlarged detail are shown the headers 30 and 50 to which respectively the tubes 6 and 7 and the tubes 8 and 9 are connected. A particular advantage and feature of my invention in the embodiment shown in Figures 1 and 6 is the close spacing of the tubes for efficient heat transfer, the gas passing along the annular spaces at high velocity. In order to space the tubes closely while providing sufficient material, that is, the so called ligament between the openings in the header to which the tubes are expanded, I propose the construction shown in Figure 8 which uses a flat plate 90 for the header 30 and corresponding flat plate 91 for the hader 50. It is thus possible to position and expand the tubes 6 and 7 and the tubes 8 and 9 into holes which have the surfaces thereof in symmetrical arrangement with respect to the tubes. It will be clear that this is not true of tubes expanded into a circular header, such as is the form of the headers 30 and 50, when the tubes are at one side of a center line or diameter of such a header in the manner shown in Figure 8. The tubes 6 and 7 and the end portions of the tubes 8 and 9 are normal respectively to the plates 90 and 91 and the tubes thus have an area of bearing surface in the holes which is symmetrical about the center lines of the tubes.

In order to accomplish the close spacing of the tubes, particularly of the tubes 8 and 9 with respect to the tubes 7, the tubes 8 and 9 are bent near their ends to be in proper relation to the header 50, which header though placed close to the header 30 cannot be placed so close as to permit the tubes 8 and 9 to enter the header 50 in direct parallel arrangement with the tubes 6 and 7. In the construction shown in Figure 8 it is proposed that the tubes shall be expanded into the plates 90 and 91 and that they shall then be welded to said plates as shown at 95.

The headers 30 and 50 may be of pipe or seamless tubing of circular cross section having a portion of the wall thereof removed by cuts made parallel to the diameter of the pipe or tube. These cuts are shown at 96 and 97 respectively in the headers 30 and 50. It will be understood, therefore, that the plates 90 and 91 of rectangular cross section may be positioned within the openings formed in the headers 30 and 50 if the width of said openings between the surfaces 96, 96 and 97, 97 are such as to correspond to the width of the plate. The plate may then be welded to the wall of the pipe and made pressure tight. By assembling the tubes in the respective plates 90 and 91 and fastening these tubes by welding, as mentioned above, the complete assembly of the tubes in the respective position relative to each other may be made and then the whole assembly fitted to the header. In a construction so made and assembled it then becomes unnecessary to provide openings in the headers 30 and 50 opposite the ends of the tubes in order to expand the tubes into the headers as is usual practice.

Moreover, with the tapered construction of the furnace and casings as described above in connection with Figure 6 it will be clear that the whole assembly of tubes connected with one header may be removed with respect to the other assembly or with respect to the casings by slipping the assembly endwise along the adjacent tubes or the casing. Thus the assembly of tubes 8 and 9 with the header 50 may be removed as a whole with respect to the assembly of tubes 6 and 7 connected to the header 30, the tapered or conical form of the assembly of the casings making it possible at once to gain clearance upon moving one assembly with respect to the other for only a short distance.

In Figure 8 also is shown orifice plates 100 having orifices 101, the orifice plates 100 being welded in the tubes 6 and 7. Also in this figure are shown the screens 105, suitably fastened in place as by welding, through which the water entering the orifices from the header 30 must pass. The character of the screen is such as to prevent material of such size as would clog the orifice 101 from reaching the orifice where it might lodge and close the orifice and make it impossible for water to enter the tube therethrough. The function of the orifice in connection with the water inlet chamber 33 of the header 30 is similar to that which has been described in connection with Figures 1 and 4.

It will also be noted in Figure 8 that the air preheater tubes are bent similarly to the tubes 8 and 9 and are fastened in an end plate 98 which is placed closely adjacent to the header 50 and at a similar angle to the plate 91 of the header 50. Thus the air preheater tubes and the annular passage in which they are placed are brought into compact arrangement with respect to the superheater tubes and the other parts of the structure. The plates 98, 91 and 90 may be fastened together by suitable means or with a suitable packing therebetween so as to prevent the escape of gases between these members, thus to confine the gas flowing from the combustion chamber through the annular passage between the wall 10 and the casing 15 and to make it flow reversely through the annular passage between the casings 15 and 20. It will be understood that the air preheater structure may be removed with respect to the superheater and with respect to the casing 15 in a manner similar to that described in connection with the superheater, that is, by endwise withdrawal of the assembly of air preheater tubes.

In order to disassemble the structure, the hemispherical portion 24 of the enclosing casing 20 may be removed by separating the portion 24 from the casing 20, for example at a joint adjacent the wall 23, Fig. 6. The assembly of the air preheater tubes fastend in the plates 98 and 23 may then be withdrawn, sliding this structure over the casing 15. The enclosing casing 20 may conveniently be removed at the same time with said assembly. By similarly removing the hemispherical casing 16 together with the bulged portion 62 thereof and then removing the casing 15, access to the superheater tubes may be had. As mentioned above, these tubes may then be withdrawn with respect to the steam generating tubes 6 and 7. Thus easy access is given to all of the tubes without removing the tubes from their respective headers and supporting structures.

In Figure 11 is shown an element which advantageously may be used, especially for the superheater construction of my invention. A U tube 8 has the ends of the legs of the U fastened into the annular header 50. Upon the bow of the U of the tube a connection 60 is made having a reverse portion 110 leading to the header 61. It will be clear that a fluid such as the steam to be superheated if introduced into the header 50 may flow through the legs of the U toward the bow and then through the connection 60 and the reverse portion 110 to the header 61. In arrangements of the tubes having the planes of the U's parallel, as has been described in connection with Figure 1, it will be apparent that a single connection 60 from each U tube element may be carried to the superheated steam collecting header 61. This header may be of annular form, as is provided by header 52 of Figure 1, or it may be of any other form, the reverse portions 110 of the element being suitably formed to connect to the header 61. Also it will be apparent that individual tube elements of this type may be withdrawn from the headers 50 and 61 in a direction toward the right of the figure.

In Figure 12 is shown another modification of tube elements which advantageously may be used as super heater elements although not limited to such use. Tubes 8 and 9 having portions respectively 115 and 116 bent transversely of the straight portions of the tubes toward the center or axis of the space to be enclosed by the tubes 8 and 9 have the ends of their straight portions connected to an annular header 50 in a manner similar to that shown in Figure 11. Each of the tubes 8 and 9 have reverse portions 117 and 118 respectively. These reverse portions as shown are continuations of the transverse portions 115 and 116 and are connected thereto by the bends 119 and 120. Thus it will be clear that a fluid, such as steam to be superheated, entering the header 50 may pass continuously through the legs of the tubes 8 and 9, the transverse portions 115 and 116 and the reverse portions 117 and 118 to the annular header 52. By comparison with Figure 1, it will be understood that the reverse portions 117 and 118 correspond with those portions of the J shaped superheater tubes described in connection with Figure 1 which are connected to the header 52 of said figure. However, in the arrangement shown in Figure 12 the crossing of the bends or bows of the J's as shown in Figure 1 is avoided by bending the ends of the tubes reversely as described. Each tube may be bent to the form shown in a plane and the curvature of the bends may be of such size as to connect to the annular header 52. Thus it becomes possible in the construction of Figure 12 to withdraw the tubes 8 and 9 by disconnecting these tubes from the headers 50 and 52 without disturbing adjacent tubes which, in the J form of Figure 1, may cross the tube to be withdrawn. Moreover, in Figure 12 the concentration of the heating surface at the end of the furnace at which the bends ars bows are positioned is obtained in the same manner as described in connection with Figure 1.

In order to protect the sheet metal wall 1 and the flared flange portion 2 thereof from the excessive heat of the burner which is placed adjacent to these portions of the structure, I provide a coil of pipe or tubing having one end thereof connected to the chamber 33 of the header 30 and the other end thereof connected to the chamber 32 of said header 30. This coil may be provided at the end which is connected to the chamber 33 with an orifice so that the tube may operate in the same manner as the steam generating tubes as heretofore described. The tube may be bent and coiled to conform to any shape of this end wall and of its flared flange portions, it being possible with tubes operated in the manner described to insure the flow of water through the tube for protection of the coiled tube as well as of the sheet metal wall portions by the continuous flow of water provided in tubes operated in this manner.

In the construction shown in the embodiment of the invention shown in Figure 6, it will be noted that an outer casing or housing 130 surrounds the entire structure consisting of steam generating tubes, superheater tubes and air preheater tubes with the several casings. While in many cases this outer casing or housing is unnecessary and the air may enter the opening 25 as described above directly from the atmosphere or may be delivered to said opening through suitable conduits from a fan or other air propelling apparatus, in some constructions the provision of an annular space surrounding the entire heat confining structure, accomplished by the use of the outer casing or housing, makes unnecessary long conduits for the air while at the same time affording means for decreasing the amount of heat lost by radiation or conduction. The heat reaching the casing 20 by conduction or radiation may be absorbed by air traveling toward the opening 25 through the annular space between the casings 20 and 130. When to form a rigid but light construction of the steam generating unit the wall 10 and the casings 15 and 20 are made of steel or other strong material, preferably heat resisting steel such as chrome nickel steel for those parts exposed to high heat, and the parts are suitably braced as has been described, the outer casing or housing 130 may be made of light weight material, for example, sheet aluminum supported upon the enclosing casing 20 and spaced therefrom by suitable supports or spacers 131. In some cases also the enclosing casing 20 may be of sheet aluminum, thus forming a very light, rigid and completely insulated unit.

As will be noted, the casing 130 has a portion 132 of hemispherical shape without opening therein which surrounds the hemispherical portion 24 of the casing 20. At the burner end of the structure the end wall 133 of the outer housing or casing is provided to complete the enclosure of the whole structure. The air inlet 134 is shown at the lower portion of the burner end of the outer housing to which may be connected the fan or other air propelling device. The air thus may be forced to circulate around the structure and lengthwise through the annular space between the enclosing casing 20 and the housing 130 and then to enter the opening 25, thence to pass into the annular space leading to the air preheater tubes. It will be apparent that in the arrangement shown in Figure 6 the air propelling device may be placed closely adjacent to the pump 36 shown in this figure which makes possible the location of the various parts of the auxiliary equipment of the generator in close relation to facilitate handling and attendance.

Various modifications may be made to the structure as illustrated. For example, while the drawings show a structure in the form of a right cylinder or in the form of a frustrum of a cone having a circular cross section, it is possible to modify the cylindrical surface to provide a different cross section, the curved portion at the end of the structure being correspondingly modified while maintaining the parallel arrangement of the tubes. Thus instead of having a hemispherical form at the end of the structure, an oblate spheroidal, ellipsoidal or similar surface would be formed if the cross section of the structure were elliptical or had one diameter greater than the other. Such modifications would permit, for example, of utilizing two burners instead of the one placed upon the axis of the furnace as shown in the drawings. Another modification would be provided by utilizing two half cylinder sections for the sides to the furnace structure connected by parallel planes tangent to the half cylinders. It will be apparent that such a form would make possible the placement of two burners, one at each axis of the half cylinders. Moreover, it will be clear that the parallel arrangement of the tubes, both within the furnace wall 10 and within the annular spaces, may be maintained as well as the parallel placement of the U form and J form tubes; also of the tubes having the bent portions therein in the modified form of Figures 11 and 12.

In the claims expressions have been used broadly and generically to designate surfaces of which cylinders, cones and spheres are typical but constitute the usual regular forms of such surfaces. In the claims the expressions "of a form containing line elements" and "of a form containing rectilinear elements" have been used. Cones and cylinders and spheres constitute surfaces which contain line elements; cones and cylinders representing surfaces containing rectilinear elements. Broadly, a surface such as a cone, cylinder or sphere is one formed by the movement of a line into successive positions in a definite relation to each other. A cylinder, for example, is generated by the movement of a straight line into positions parallel to each other. A cone is generated by movement of a straight line having one point thereof fixed and having another point thereof determined by contact with a smooth curve such as a circle, ellipse or other outline. A spherical surface is the result of the movement of a circle about one of its diameters as an axis. Commonly, cylinders and cones are formed by movement of the lines in contact with a circle. Broadly, however, and particularly for the purposes of the invention, the "line element" need not be a straight line. For example, a surface of revolution might be formed by movement of a curved line into substantially parallel positions in contact with a circle or similar smooth curve. The heat exchange tubes of the invention might conform to such a curved "line element" of the casing surface. The expressions adopted in the claims, therefore, are intended to describe the type of surface which is produced by movements of such line elements into parallel or angularly displaced positions but in which the line elements extend generally in the same direction. This makes possible in the particular embodiment of the invention illustrated the placement of the legs of the U tubes or of the J tubes in generally parallel or like-extending direction with the elements of the wall or casing.

Other modifications of the construction illustrated and described above may be made to suit the structural conditions. For example, the headers 30 and 50 may be placed in planes not at right angles but inclined to the axis of the furnace, and these headers may be in different planes instead of as shown substantially in the same or closely adjacent transverse planes. The superheated steam outlet header 52 may be placed at some other point than the point of juncture between the straight portions of the tubes and the bends or bows thereof. The bends in both the U shaped steam generating tubes and the J shaped superheating tubes may be formed with the transverse portions straight, connected to the longitudinal legs by bends of greater or less radius. In such case the header 52 may be positioned substantially at the end of the furnace. In general, however, the diameter of the annulus of the header 52 will be larger than the bundle of tubes in the annular space so that the withdrawal of the tubes may easily be effected.

To suit such variations in the structure the opening 12 from the furnace to the annular passage may be of elongated form or two or more such openings may be placed in positions at one side of the axial position. In some cases in order properly to proportion the area of the opening from the furnace into the annular space, the opening 12 may be the full opening which is provided at the end of the cylinder or of the frustrum of the cone formed by the sheet metal wall 10, in that case there being no curved portion 11 utilized as an extension of the wall 10. The relations between the size of the opening from the furnace and the width of the annular space will be determined by the conditions of capacity and efficiency, the kind of fuel used, and other conditions which will be understood by the engineer.

Similarly the opening 25 in the enclosing casing may be differently located or a plurality of openings may be provided properly to deliver and distribute the air to the annular space between the casings 16 and 24. All such modifications are within the scope of my invention as above described and as covered by the claims. Also within the scope of the invention are included such modifications of the casings as will permit these to be made in sections separable from each other at joints extending longitudinally or circumferentially of the structure, or both, to suit different conditions.

Having described my invention, I claim:

1. In a heat exchanger, a furnace chamber having an enclosing wall of a form containing line elements extending along the wall in one general direction, a casing surrounding said furnace exteriorly of said wall and spaced therefrom to provide an annular space having its length extending in the same general direction as the elements of said wall, said annular space being connected to the furnace for passage of the combustion gases from the furnace through said space in a direction generally that of the elements of said wall, and tubes for absorption of the heat generated in the furnace having the parts of their length proceeding from each end of each tube extending in the same general direction as the elements of said wall and having the part of their length between said end parts extending transversely to the length of said elements and across the end of the furnace, at least some of said tubes having their end parts positioned in said annular space, said casing and said wall being so formed and so positioned in relation to each other and to said tubes as closely to confine to said tubes the gases passing through said annular space.

2. In a steam generator, a plurality of steam generating tubes arranged with like extending portions about a space for combustion of fuel, a partition wall placed between said like extending portions of the tubes and surrounding said space to position some of the tubes within the space so as to be subjected to radiant heat of the combustion, and a casing surrounding all said tubes and so constructed with respect to the tubes and to said partition wall as to provide an annular space connected to the combustion space of such form as closely to confine to said tubes the gases flowing from said combustion space to flow along said like extending portions of the tubes located in said annular space, said tubes also having a part of their length between two like extending portions subjected to the same kind of heat arranged transversely of said like extending portions and positioned at the side of the combustion space transverse to said partition wall.

3. In a heat exchanger, a furnace chamber having an enclosing wall of a form containing rectilinear elements extending along the wall in one general direction, a casing surrounding said furnace exteriorly of said wall and spaced from said wall to provide an annular space having its length extending in the same general direction as the elements of said wall, said annular space being connected to the furnace for passage of the combustion gases from the furnace through said space in a direction generally parallel to the elements of said wall, and tubes having a portion of their length extending in said annular space in the same direction as the elements of said wall for absorption of heat from said gases, said portions of said tubes having their ends connected to an annular header located at one end of the furnace substantially in alignment with said annular space, said tubes having a portion of their lengths between two portions in the annular space extending transversely across the end of the furnace chamber remote from said header, said wall and said casing being so constructed with respect to said tubes as closely to confine to said tubes the combustion gases passing through said annular space.

4. In a heat exchanger, a furnace chamber having an enclosing wall of a form containing rectilinear elements extending along the wall in one general direction, a casing surrounding said furnace exteriorly of said wall and spaced from said wall to provide an annular space having its length extending in the same general direction as the elements of said wall, said annular space being connected to the furnace for passage of the combustion gases from the furnace through said space in a direction generally parallel to the elements of said wall, U tubes having the legs of the U's extending in said annular space in the same direction as the elements of said wall for absorption of heat from said gases, and an annular header located at one end of the furnace having separating walls transversely of its annulus to divide the header into two chambers, said tubes having one end of each U connected to one chamber of the header and the other end of each U connected to the other chamber of the header, the bends of the U's extending across the end of the furnace remote from said header, said wall and said casing being arranged closely adjacent at least to said legs of the U's so as closely to confine to said tubes the gases flowing through said annular space.

5. In a steam generator, a furnace chamber having an enclosing wall of a form containing rectilinear elements extending along the wall in one general direction, a casing surrounding said furnace exteriorly of said wall and spaced therefrom to provide an annular space having its length extending in the same general direction as the elements of said wall, said annular space being connected to the furnace for passage of the combustion gases from the furnace through said space in a direction parallel to the elements of said wall, steam generating tubes extending in said annular space in the same direction as the elements of said wall for absorption of heat from said gases, air preheater elements for flow therethrough of the air for combustion arranged with their extent in the general direction of the elements of said wall and surrounding said casing, a casing surrounding said air preheater elements and providing an annular space in which said elements are located, means for causing the gases discharged from contact with said tubes to flow along said annular space and said elements in contact with the exterior surface thereof, and means acting with said casings and with said wall to hold said casings in position with respect to each other and to said wall and to maintain said annular spaces.

6. In a steam generator, a furnace chamber having an enclosing wall of a form containing rectilinear elements extending along the wall in one general direction, a casing surrounding said furnace exteriorly of said wall and spaced therefrom to provide an annular space having its length extending in the same general direction as the elements of said wall, said annular space being connected to the furnace for passage of the combustion gases from the furnace through said space in a direction parallel to the elements of said wall, steam generating tubes extending in said annular space in the same direction as the elements of said wall for absorption of heat from said gases, air preheater elements for flow therethrough of the air for combustion arranged with their length in the general direction of the elements of said wall and surrounding said casing, a casing surrounding said air preheater elements and providing an annular space in which said elements are located, means for causing the gases discharged from contact with said tubes to flow along said annular space and said elements in contact with the exterior surface thereof in a direction counter to the flow of the air for combustion through said air preheater elements, and means acting with said casings and with said wall to hold said casings in position with respect to each other and to said wall and to maintain said annular spaces.

7. In a heat exchanger, a furnace chamber having an enclosing wall of sheet metal of a form containing line elements extending along the wall in one general direction, a sheet metal casing surrounding said furnace exteriorly of said wall and spaced therefrom to provide an annular space having its length extending in the same general direction as the elements of said wall, said sheet metal wall having a portion connected to said portion containing line elements and of a form having a curved surface to provide a wall for the furnace transverse to the portion containing the line elements, said curved portion having an opening therein for passage therethrough of the gases of combustion from the furnace.

8. In a heat exchanger, a chamber having an enclosing wall of sheet metal of a form containing line elements extending along the wall in one general direction, a sheet metal casing surrounding said chamber exteriorly of said wall and spaced therefrom to provide an annular space having its length extending in the same general direction as the elements of said wall, said sheet metal wall having a portion connected to said portion containing line elements and of a form having a curved surface to provide a wall for the chamber transverse to the portion containing the line elements, said casing also being formed with a curved surface to provide an annular space surrounding the curved surface portion of the sheet metal wall.

9. In a steam generator, a wall of sheet metal shaped about an axis to a form containing line elements extending generally in the direction of said axis to enclose a furnace chamber, a source of heat located at one end of the axial length of the furnace chamber, steam generating tubes in U form having the bends of the U's in semi circular form, said tubes being arranged with the planes of the U's substantially parallel, the legs of the U's of said tubes being arranged adjacent said wall and generally in the direction of the line elements of said wall, the bends of the U's being of different radius in different planes, the legs of the U's and the bends of the U's respectively being substantially parallel whereby the assembly of the bends of the U's is in the form of a curved surface, said wall having a portion extending along the bends of the U's conforming to said curved surface of said assembly, said curved surface portion of said wall having an opening therein substantially upon the axis of the furnace at the end thereof remote from said source of heat for passage through said opening of the gases of combustion from the furnace, and a casing surrounding said sheet metal wall and spaced therefrom to provide an annular space having its length extending in the same general direction as the line elements of said wall, said casing being closed at the end of the furnace remote from the source of heat whereby the gases of combustion passing through the opening are caused to flow lengthwise along the annular space toward the end of the furnace at which is located the source of heat.

10. In a heat exchanger having a chamber surrounded by an enclosing wall, a casing surrounding said wall and spaced therefrom to form therewith an annular space, a header at one end of said annular space adjacent one side of the chamber and a second header at the other end of the chamber adjacent the opposite side of the chamber, and tubes extending between the headers through said annular space and across the end of the chamber.

11. In a heat exchanger having a chamber surrounded by an enclosing wall, a casing surrounding said wall and spaced therefrom to form therewith an annular space, an annular header arranged in a plane transversely of the length of said annular space, a second annular header adjacent the opposite end of said annular space, and tubes of J form connected between the headers, the bends of the J's extending transversely across one end of the chamber.

12. In a fluid heating plant having a furnace surrounded by an enclosing wall, a casing surrounding said wall and spaced therefrom to form therewith an annular space, an annular header arranged in a plane transversely of the length of said annular space, a second annular header adjacent the opposite end of said annular space, and tubes of J form connected between the headers, the bends of the J's extending transversely across one end of the furnace, said annular space being connected to said furnace at one end of the furnace for passage of the gases along said tubes toward the other end of the furnace, and means for introducing fluid to be heated into the header at said other end of the furnace to flow through said J tubes to the other header.

13. A heat exchanger comprising an annular header, a plurality of tubes of J form having the long leg of the J extending in a direction transverse to the plane of the annulus of said header and connected to said header in spaced generally parallel arrangement around said header and in substantial alignment therewith, and a second annular header of larger diameter than that of the annulus and positioned surrounding said legs of the J's adjacent the point of connection of said legs to one end of the bends of the J's, the other ends of the bends of the J's being connected to said second header with the bends of the J's extending across one end of the space enclosed by the long legs of the J's.

14. In a heat exchanger, a furnace chamber having an enclosing wall of a form containing line elements extending along the wall in one general direction, a casing surrounding said furnace exteriorly of said wall and spaced therefrom to provide an annular space having its length extending in the same general direction as the elements of said wall, said wall and said casing having portions at one end of the furnace chamber extending transversely of the general direction of said elements, said wall having an opening therein at said end of the furnace, said casing having no opening therein at said end of the furnace whereby the combustion gases are caused to flow through said opening in said wall and along the annular space toward the opposite end of the furnace, an annular header at said opposite end of the furnace in a plane transverse to the direction of said elements of the wall, tubes located in said annular space in generally parallel arrangement and connected at their ends to said header, said tubes having portions bent to continue along the annular space formed at the end of the furnace opposite said header, and a second header adjacent the points of juncture of the portions of the tubes extending in the direction of the elements of said wall with the bent portions of said tubes, the other ends of the bent portions of said tubes being connected to said second header, the form and arrangement of the tubes being such that the tubes lying in the annular space on one side of the furnace and connected to a header at said side are connected at their other ends to the other header at the opposite side of the furnace.

15. In a fluid heating plant, a furnace chamber having an enclosing wall of sheet metal of a form containing line elements extending along the wall in one general direction, a sheet metal casing surrounding said furnace exteriorly of said wall and spaced therefrom to provide an annular space having its length extending in the same general direction as the elements of said wall, said sheet metal wall having a portion extending in a curved surface to provide a wall for the furnace transverse to the portion containing the line elements, said casing also being formed with a curved surface to provide an annular space surrounding the curved surface portion of the sheet metal wall, said curved portion of the wall having an opening therein for passage therethrough of the gases of combustion of the furnace, fluid conducting tubes extending in said annular space in the general direction of the elements of said wall and provided with bends conforming to the curved surfaces at said end of the furnace, a fluid inlet header in the form of an annulus at the end of the furnace opposite said opening in said wall, and a fluid outlet header in the form of an annulus located adjacent the point of juncture between the curved portion of the walls and the portion thereof extending lengthwise of the furnace, said tubes being connected between said headers.

16. A heat exchanger for use in connection with a furnace having an enclosing wall, comprising a pair of annular headers each in a plane transversely of a longitudinal plane through the center of the furnace and longitudinally remote from each other, and a heat exchanger tube connected to one of said headers at one side of said longitudinal plane and extending longitudinally along the wall of the furnace toward the other end of the furnace, said tube having a portion extending transversely of the furnace at said other end thereof, said tube having its other end connected to said other header on the opposite side of said longitudinal plane.

17. A heat exchanger comprising an annular header, a plurality of U tubes each having both its ends connected to said annular header and having the legs of the U's extending in a direction transversely of the plane of the annulus of said header and in generally parallel arrangement, said tubes each having an opening therein at a point upon the bow of the U, a second header adjacent said bows of the U's, and connections to said second header from said opening of the U tubes.

18. An element for a heat exchanger comprising a tube having a portion in the form of a J including a curved bow portion and a portion as a continuation of the curved portion of the J bent reversely upon said curved portion and extending generally parallel thereto.

19. A heat exchanger comprising an annular header, a plurality of tubes arranged with a portion of each tube extending in a direction transversely of the plane of said annular header and generally parallel to a similar portion of the other tubes, said portions having their ends connected to said header at points thereon spaced around the annulus of said header, said tubes having other portions remote from said header bent transversely toward the center of the space surrounded by said generally parallel portions, said transverse portions being in the form of U's with one end of the U connected to the parallel portions of the tubes and the other end of the U connected to an annular header in a plane transversely of the parallel portions of the tubes.

20. In a heat exchanger, a chamber having an enclosing sheet metal wall of a form containing line elements extending along the wall in one general direction, a plurality of U tubes having the legs of the U's extending along the wall exteriorly thereof in the direction of said elements and in spaced arrangement around the chamber, said tubes having the bows of the U's adjacent one end of the chamber, said sheet metal wall and the legs of said U's diverging toward the opposite end of the chamber, and an annular header at said opposite end of the chamber having the ends of the legs of the U's connected thereto, the diametral dimension of the annulus of the header being sufficient to permit the assembly of the U tubes and the header to be withdrawn in a direction toward the bow of the U's from its position surrounding the wall and the chamber.

21. In a heat exchanger a sheet metal wall enclosing a chamber having a diametral dimension less at one end thereof than at the other, a casing surrounding said wall and spaced therefrom to form therewith surrounding said chamber an annular space of greater annular width at one end of the chamber than at the other and heat exchange elements mounted in said annular space, said sheet metal wall and said casing being so constructed in relation to each other as to provide a passage connecting to said annular space only at said end of greater annular width and to leave no substantial space between said elements and said casing and between said elements and said wall so as closely to confine said elements within said annular space.

22. In a heat exchanger a sheet metal wall enclosing a chamber having a diametral dimension less at one end thereof than at the other, a casing surrounding said wall and spaced therefrom to form therewith surrounding said chamber an annular space of greater annular width at that end of the chamber having the smaller diametral dimension, said casing having a smaller diametral dimension at said end of the chamber than at the opposite end thereof and heat exchange elements mounted in said annular space, said sheet metal wall and said casing being so constructed in relation to each other as to provide a passage connecting to said annular space only at said end of the chamber of smaller diametral dimension and leaving no substantial space between said elements and said casing and between said elements and said wall so as closely to confine said elements within said annular space.

23. In a heat exchanger a casing providing a wall for confining a heat vehicle within a space enclosed by said casing, said casing having a part thereof of a form determined by like-extending lines in the surface of said casing and surrounding said space, said casing having a part thereof at an end of said space extending transversely of said like extending lines, heat exchange elements within the space enclosed by said casing arranged to receive the heat from the heat vehicle, a second casing surrounding said first casing and spaced therefrom to form an annular space connected to said space enclosed by said first casing and to provide a passage extending in the general direction of said like-extending lines of said first casing, and heat exchange elements mounted in said annular space and extending in a direction generally that of said like-extending lines of said first casing and arranged for flow of the heat vehicle in contact with one side of their heat transfer surfaces and for flow of a heat absorbing fluid on the other side of said heat transfer surfaces, at least some of said heat exchange elements being steam generating elements and others being elements for the heating of the fluid substantially in the form of a gas, at least some of said heat exchange elements having a portion thereof extending transversely of said like-extending lines of said first casing along and substantially conforming to the transverse portion of at least one of said casings.

24. In a heat exchanger having a furnace, U tubes arranged with the U's in generally like-extending planes and with the ends of the U's adjacent one end of the furnace, the legs of said U tubes being located in an annulus around said furnace and in staggered spacing in the annulus, and a sheet metal wall placed between alternate legs and around said furnace and having an extent to confine the combustion gases within the furnace and to expose to the radiant heat of the furnace alternate legs substantially throughout the extent thereof and so as to discharge said gases from the furnace substantially only across the bends of the U's, the number and spacing of said tubes being such that the legs which are in the furnace intercept said radiant heat sufficiently to protect said sheet metal wall from overheating.

25. In a heat exchanger a wall enveloping a chamber, a casing surrounding said chamber exteriorly of said wall and spaced therefrom to provide an annular space having an extent in the direction transversely of the plane of the annulus, said wall and said casing respectively having portions spaced apart in generally parallel relation and forming a space connected to said annular space, said portions of said wall and of said casing each extending transversely to said direction of said extent of said annular space and inwardly therefrom.

26. An element for a heat exchanger comprising a U tube, and a tubular part connected to said U tube at a point on the bow of the U and having the other end of said part adjacent a leg of the U.

27. In a heat exchanger a furnace chamber having an enveloping wall surrounding the furnace, said chamber also having a wall extending inwardly from said enveloping wall and transverse to said enveloping wall and acting with said enveloping wall to enclose the furnace chamber at an end thereof, said transverse wall having therein an opening for passage therethrough of the combustion gases from the furnace, a casing surrounding said furnace exteriorly of said enveloping wall and spaced therefrom to provide an annular space between said casing and said wall and also spaced from said transverse wall but adjacent thereto to cause said gases from the furnace to pass through said spaces in the direction from said opening toward the portion of the furnace opposite to said transverse wall, and heat exchange elements in said annular space and in the space between said transverse wall and said casing.

28. In a heat exchanger a furnace chamber having an enveloping wall surrounding the furnace, said chamber having a wall extending inwardly from said enveloping wall and transverse to said enveloping wall and acting with said enveloping wall to enclose the furnace chamber at an end thereof, said transverse wall having therein an opening for passage therethrough of the combustion gases from the furnace, a casing surrounding said furnace exteriorly of said enveloping wall and spaced therefrom to provide an annular space between said casing and said wall and also spaced from said transverse wall but adjacent thereto to cause said gases from the furnace to pass through said spaces in the direction from said opening toward the end of the furnace opposite to said transverse wall, and heat transfer elements arranged in said annular space and constructed for flow of the gases of combustion in contact with one side of their heat transfer surfaces and of heat absorbing fluid on the other side of said heat transfer surfaces, said elements having portions of their extent in the space between said casing and said enclosing wall and portions of their extent between said casing and said transverse wall, said casing and said walls being so arranged with respect to each other and with respect to said heat transfer elements as to confine said combustion gases to flow in close contact with said heat transfer elements substantially throughout the cross section of the flow thereof at least through said annular space toward said opposite end of the furnace.

29. A heat exchanger comprising a pair of associated headers each having a flat face provided by a cross section as a segment of a circle and each formed as an annular ring, one of said headers having a greater diameter of the ring than the other but of such diameter that the rings of the headers may be located closely adjacent each other, said headers being so formed one with respect to the other that the chordal dimensions of their segments in the common plane transversely of their annuli are at an angle to each other, and a set of tubes extending in a direction generally transversely of the planes of the rings and connected to the headers at said chordal flat faces, some of said tubes being bent with respect to others of the tubes at an angle substantially equal to the angle formed by said chordal flat faces to connect said tubes to said headers and to arrange the portions of said tubes which extend in the direction transversely of the planes of the rings in closer spacing than is possible with the adjacent arrangement of the headers alone.

30. A heat exchanger comprising a pair of associated headers each having a cross section providing a flat face, said headers being positioned closely adjacent to each other and being so positioned that the dimensions of said flat faces which are in a common cross sectional plane are at an angle to each other, and a set of tubes connected to said headers respectively at said faces thereof, the tubes connected to one of said headers being bent at an angle with respect to the tubes connected to the other header substantially equal to the angle formed by said faces of said headers to position the lengths of said tubes in like extending direction and in close relation.

31. In a heat exchanger, a wall of sheet metal enclosing a furnace chamber, a sheet metal casing surrounding said wall and spaced therefrom to provide an annular space connected to said chamber to receive heating gases from said chamber, heat transfer elements arranged in spaced arrangement in said annular space to transfer heat from said gases, and means for spacing said heat transfer elements in said annular space, said spacing means being so constructed and being so connected to said wall and to said casing as to act with said wall and with said casing independently of said heat transfer elements to form said heat exchanger as a rigid structure.

32. In a heat exchanger, a wall of sheet metal enclosing a furnace chamber, a sheet metal casing surrounding said wall and spaced therefrom to provide an annular space connected to said chamber to receive heating gases from said chamber, heat transfer elements, at least some of said heat transfer elements being steam generating tubes arranged to receive heat from said gases, at least some of said heat transfer elements being arranged in spaced arrangement in said annular space to transfer heat from said gases, and means for spacing said heat transfer elements in said annular space, said spacing means being so constructed and being so connected to said wall and to said casing as to act with said wall and with said casing independently of said heat transfer elements to form said heat exchanger as a rigid structure.

33. In a heat exchanger, a wall of sheet metal surrounding a furnace chamber, a sheet metal casing surrounding said sheet metal wall to form with said wall an annular space exteriorly of and connected to the furnace chamber, heat transfer tubes lining said sheet metal wall and closely adjacent thereto to protect said metal wall from overheating, and heat transfer tubes lining said casing and forming at least a part of the heating surface in said annular space, said tubes which line said wall and said casing extending therealong in the direction transversely of the annulus, said casing and said sheet metal wall being so arranged with respect to each other and with respect to the heating surface within the annular space as to cause the gases from said chamber to flow along said annular space closely confined to said heating surface.

34. In a heat exchanger, a wall of sheet metal surrounding a furnace chamber, a sheet metal casing surrounding said sheet metal wall to form with said wall an annular space exteriorly of and connected to the furnace chamber, heat transfer tubes lining said sheet metal wall and closely adjacent thereto to protect said metal wall from overheating, and heat transfer tubes forming at least a part of the heating surface in said annular space and lining said casing and closely adjacent thereto to protect the metal thereof from overheating, said tubes which line said wall and said casing extending therealong in the direction transversely of the annulus.

35. In a steam generator, an enclosing casing so partitioned interiorly as to provide a combustion chamber having a cylindrical side wall stopping short of the rear end of said chamber and a substantially annular flue about said combustion chamber having its outer wall substantially concentric with said chamber wall, a rear wall continuous with said outer flue wall and spaced from the end of said chamber wall to provide communication between the chamber and the flue, means for protecting said cylindrical walls, comprising steam generator tubes extending lengthwise of said combustion chamber wall and lengthwise of said flue walls, and steam generator tubes also covering the surface of said rear wall.

36. In a steam generator, an enclosing casing so partitioned interiorly as to provide a combustion chamber having a sheet metal lateral wall, a second sheet metal wall surrounding and spaced from said combustion chamber wall to form a flue about said combustion chamber, a rear wall continuous with said second wall and spaced from the end of said combustion chamber wall to provide communication between the combustion chamber and the flue, and steam generator tubes lining and protecting the wall of said combustion chamber, the two walls of said flue and said rear wall.

37. In a steam generator, a furnace chamber having an enclosing wall of a form containing line elements extending along the wall in one general direction, a casing surrounding said furnace exteriorly of said wall and spaced therefrom to provide an annular space having its length extending in the same general direction as the elements of said wall, said annular space being connected to the furnace for passage of the combustion gases from the furnace through said space in a direction generally that of the elements of said wall, a second casing surrounding said first casing and spaced therefrom to form an annular space and to provide a passage extending in the general direction of the elements of said wall and connected to said first annular space to receive the gases therefrom, heat transfer elements mounted in both said annular spaces and extending in a direction generally that of the elements of said wall and arranged for flow of the gases of combustion in contact with one side of their heat transfer surfaces and of a heat absorbing fluid on the other side of said heat transfer surfaces, at least some of said heat transfer elements being steam generating elements and others being elements for the heating of a fluid substantially in the form of a gas, said casing and said wall being arranged in relation to said elements to confine said gases from the furnace to flow in heat transferring contact with said elements, and means acting with said casings and with said wall to hold said casings in position with respect to each other and to said wall and to maintain said annular spaces.

38. In a steam generator having a furnace, a header in the form of a circular annulus located at one end of the furnace in a plane transverse to the extent of the furnace in a direction from said header toward the opposite side of the furnace, U tubes having both ends of each U connected to said header, said U tubes being arranged in generally parallel planes, the legs of said U tubes being located around said furnace in substantially uniform but staggered spacing, and a sheet metal wall placed between alternate tubes and around said furnace and having an extent to confine the combustion gases within the furnace and to expose the legs of alternate tubes to radiant heat of the furnace substantially throughout the extent thereof in the furnace and so as to cause said gases to be discharged from the furnace substantially only across the bends of the U's, the number and spacing of said tubes being such as to intercept said radiant heat sufficiently to protect said sheet metal from overheating, the bends of the U's being of generally semi-circular shape and the radii of said bends being different for tubes in different planes, whereby the assembly of the bends is of generally hemispherical form, said sheet metal wall extending partially along said bends to confine the combustion gases within the furnace but to provide the exit therefrom for said gases passing across said U bends.

39. In a steam generator, an enclosing casing so partitioned interiorly as to provide a combustion chamber and a flue surrounding said combustion chamber and communicating therewith at one end, all formed of sheet metal, steam generating tubes lining and protecting the walls of said combustion chamber and also the walls of said flue, said partitions defining a second flue surrounding said first mentioned flue and communicating therewith at the end of said first mentioned flue remote from its communication with the combustion chamber, air preheater tubes extending through said second flue, and a jacket surrounding said second flue and defining an air passage communicating with said air preheater tubes, all of said parts being so constructed and arranged that the heat of the combustion gases which impinges on the interior partitions which are subjected to heat is reduced either by circulating water or circulating air, thereby permitting the use of sheet metal partitions as well as a sheet metal casing.

40. In a steam generator, an enclosing casing so partitioned interiorly as to provide a combustion chamber and a flue surrounding said combustion chamber and communicating therewith at one end, all formed of sheet metal, steam generating tubes lining and protecting the walls of said combustion chamber and also the walls of said flue, said partitions defining a second flue surrounding said first mentioned flue and communicating therewith at the end of said first mentioned flue remote from its communication with the combustion chamber, air preheater tubes extending through said second flue, a jacket surrounding said second flue and defining an air passage communicating with said air preheater tubes, all of said parts being so constructed and arranged that the heat of the combustion gases which impinges on the interior partitions which are subjected to heat is reduced either by circulating water or circulating air, thereby permitting the use of sheet metal partitions as well as a sheet metal casing, and means for positively delivering water to said steam generating tubes and causing positive flow of the water through said tubes.

WALTER DOUGLAS LA MONT.